(12) United States Patent
Zhang et al.

(10) Patent No.: US 9,295,014 B2
(45) Date of Patent: Mar. 22, 2016

(54) DIMINISHING THE IMPACT OF TIMING DELAY IN DOWNLINK SIGNALS

(75) Inventors: Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 13/083,830

(22) Filed: Apr. 11, 2011

(65) Prior Publication Data

US 2012/0093076 A1 Apr. 19, 2012

Related U.S. Application Data

(60) Provisional application No. 61/325,172, filed on Apr. 16, 2010.

(51) Int. Cl.
*H04W 56/00* (2009.01)
*H04J 11/00* (2006.01)

(52) U.S. Cl.
CPC ............. *H04W 56/00* (2013.01); *H04J 11/005* (2013.01); *H04J 11/0069* (2013.01)

(58) Field of Classification Search
None
See application file for complete search history.

(56) References Cited

U.S. PATENT DOCUMENTS

| | | | | |
|---|---|---|---|---|
| 7,636,571 B2 * | 12/2009 | Lee et al. | | 455/437 |
| 7,701,978 B2 * | 4/2010 | Kolze et al. | | 370/503 |
| 2004/0202202 A1 * | 10/2004 | Kolze et al. | | 370/503 |
| 2006/0120473 A1 | 6/2006 | Baum | | |
| 2009/0258628 A1 | 10/2009 | Lindoff et al. | | |
| 2010/0034077 A1 * | 2/2010 | Ishii et al. | | 370/210 |
| 2010/0220597 A1 | 9/2010 | Ji et al. | | |
| 2010/0222068 A1 | 9/2010 | Gaal et al. | | |
| 2010/0238821 A1 * | 9/2010 | Liu et al. | | 370/252 |
| 2010/0260151 A1 | 10/2010 | Onggosanusi et al. | | |
| 2011/0044188 A1 | 2/2011 | Luo et al. | | |
| 2011/0080896 A1 * | 4/2011 | Krishnamurthy et al. | | 370/336 |
| 2011/0190024 A1 * | 8/2011 | Seong | | H04L 1/0069 455/522 |
| 2011/0237270 A1 * | 9/2011 | Noh et al. | | 455/450 |

(Continued)

FOREIGN PATENT DOCUMENTS

| | | |
|---|---|---|
| KR | 20070083180 A | 8/2007 |
| WO | WO9908464 A1 | 2/1999 |

(Continued)

OTHER PUBLICATIONS

International Search Report and Written Opinion—PCT/US2011/032776, International Search Authority—European Patent Office—Sep. 20, 2011.

*Primary Examiner* — Gregory Sefcheck
*Assistant Examiner* — Rina Pancholi
(74) *Attorney, Agent, or Firm* — Nerrie M. Zohn

(57) ABSTRACT

When performing interference cancellation on selected information (e.g., synchronization signals, certain broadcast signals, etc.) through cross correlation, symbol periods of signals being combined will generally match up. Slight mismatches will generally produce negligible impact on interference cancellation. However, where the mismatch is severe due to significant timing offsets, serious performance degradation may occur, particularly when timing offsets are sufficiently large as to overlap data portions of a transmission. By selectively puncturing resource elements prior to the selected information and/or after the selected information, the selected information may be protected and allow for interference cancellation even in cases of large timing offsets.

21 Claims, 7 Drawing Sheets

(56) References Cited

U.S. PATENT DOCUMENTS

| | | | | |
|---|---|---|---|---|
| 2011/0319025 A1* | 12/2011 | Siomina | ............... | H04B 7/024 455/63.1 |
| 2013/0229972 A1* | 9/2013 | Lee | ................... | H04W 72/082 370/312 |
| 2014/0233407 A1* | 8/2014 | Pourahmadi | .......... | H04L 5/0073 370/252 |
| 2014/0242995 A1* | 8/2014 | Lee | ..................... | H04W 36/30 455/436 |

FOREIGN PATENT DOCUMENTS

| | | |
|---|---|---|
| WO | WO2007051158 | 5/2007 |
| WO | WO-2007083700 A1 | 7/2007 |
| WO | WO2009088251 A2 | 7/2009 |
| WO | 2010051847 A1 | 5/2010 |
| WO | WO2010124553 A1 | 11/2010 |
| WO | WO2011019835 A2 | 2/2011 |

* cited by examiner

DIMINISHING THE IMPACT OF TIMING DELAY IN DOWNLINK SIGNALS

CROSS-REFERENCE TO RELATED APPLICATION

This application claims the benefit under 35 U.S.C. §119 (e) to U.S. Provisional Patent Application Ser. No. 61/325,172 entitled DIMINISHING IMPACT OF TIMING DELAY IN DOWNLINK SIGNALS, filed on Apr. 16, 2010, the disclosure of which is expressly incorporated by reference herein in its entirety.

BACKGROUND

1. Field

Aspects of the present disclosure relate generally to wireless communication systems, and more particularly to diminishing an impact of timing offset in downlink signals.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

When performing interference cancellation on selected information (e.g., synchronization signals, certain broadcast signals, etc.) through cross correlation, symbol periods of signals being combined will generally match up. Slight mismatches will generally produce negligible impact on interference cancellation. However, where the mismatch is severe due to significant timing offsets, serious performance degradation may occur, particularly when timing offsets are sufficiently large as to overlap data portions of a transmission. By selectively puncturing resource elements prior to the selected information and/or after the selected information, the selected information may be protected and allow for interference cancellation even in cases of large timing offsets.

In one aspect, a method for diminishing an impact of timing offset in downlink signals in a wireless network having a serving cell and an interfering cell is disclosed. The method includes puncturing resource elements on a physical downlink channel of an interfering cell to protect the selected information of the physical downlink channel of the serving cell. The punctured resource elements are prior to the selected information and/or after the selected information. A signal is generated in accordance with the punctured resources.

In another aspect, an apparatus is disclosed. The apparatus includes means for puncturing resource elements on a physical downlink channel of an interfering cell to protect the selected information of the physical downlink channel of the serving cell. The punctured resource elements are prior to the selected information and/or after the selected information. A means for generating a signal in accordance with the punctured resources is also included.

Another aspect discloses, a computer program product for wireless communications in a wireless network is disclosed. The computer readable medium has program code recorded thereon which, when executed by one or more processors, cause the one or more processors to perform operations of puncturing resource elements on a physical downlink channel of an interfering cell to protect the selected information of the physical downlink channel of the serving cell. The punctured resource elements are prior to the selected information and/or after the selected information. The program code also causes the one or more processors to generate a signal in accordance with the punctured resources.

In another aspect a system for wireless communication having a memory and at least one processor coupled to the memory is disclosed. The processor(s) is configured to puncture resource elements on a physical downlink channel of an interfering cell to protect the selected information of the physical downlink channel of the serving cell. The punctured resource elements are prior to the selected information and/or after the selected information. The processor is also configured to generate a signal in accordance with the punctured resources.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
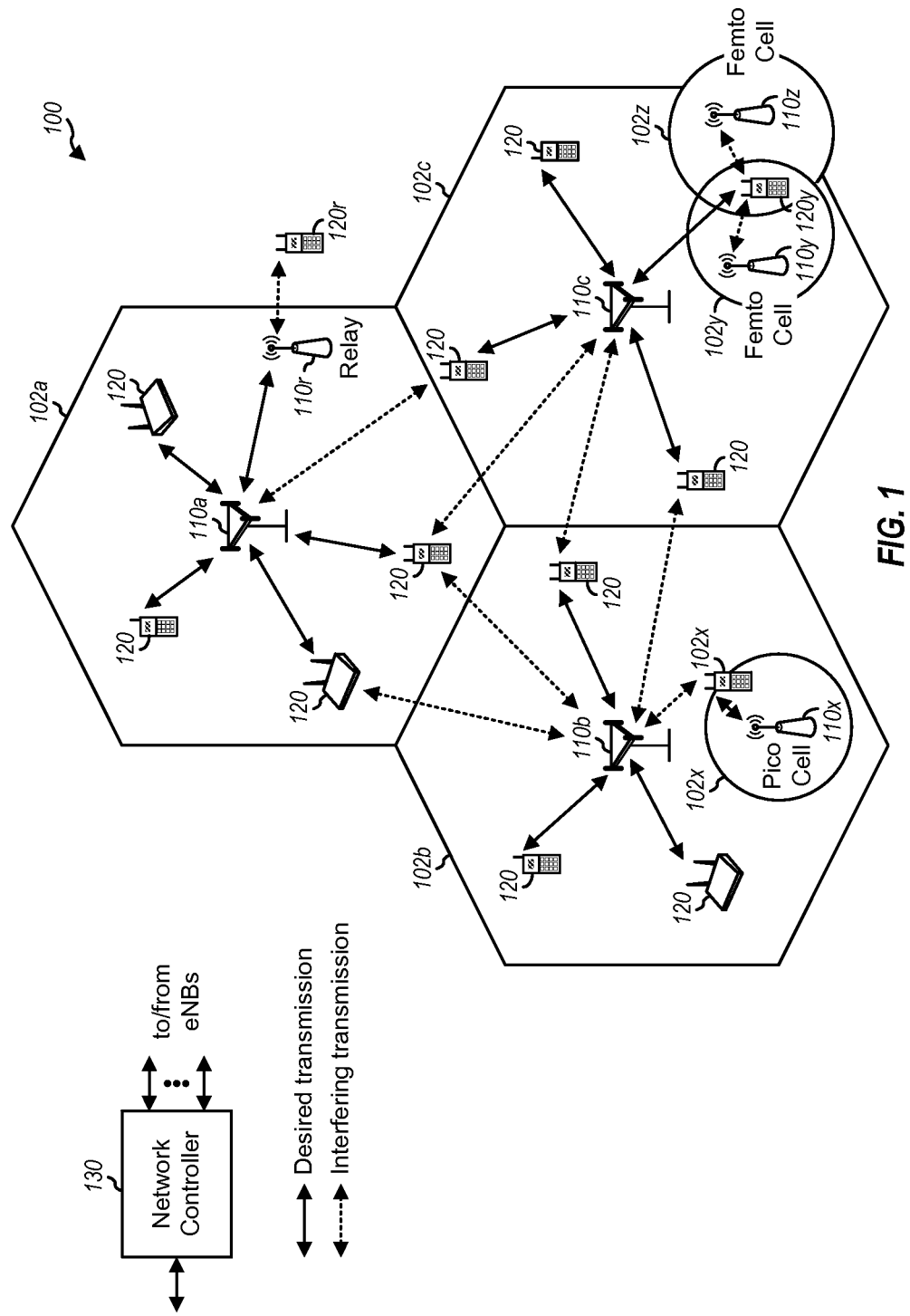
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support a synchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul 132. The eNodeBs 110 may also communicate with one another, e.g., directly or indirectly via a wireless backhaul 134 or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
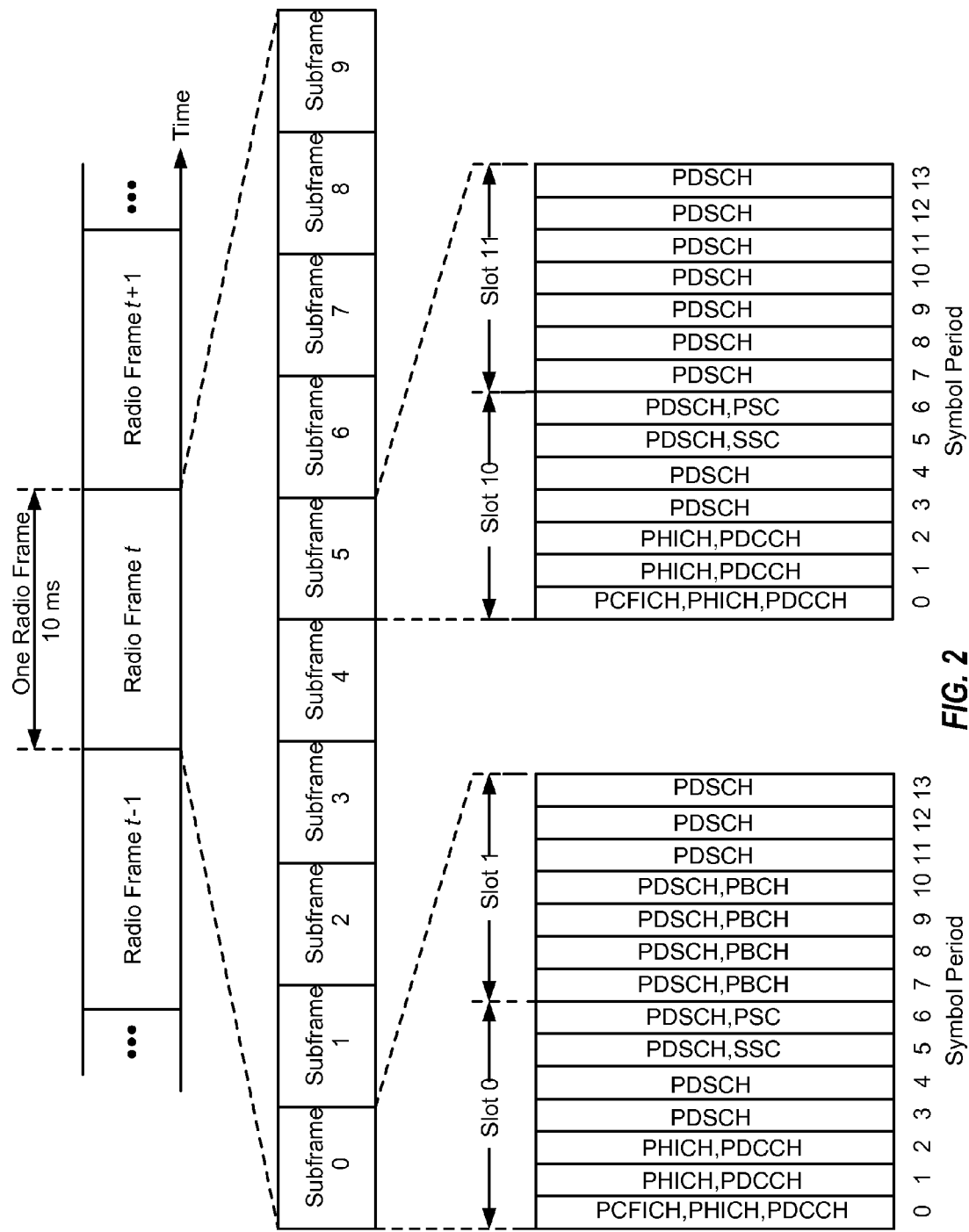
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSS, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSS, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

Figure 3:
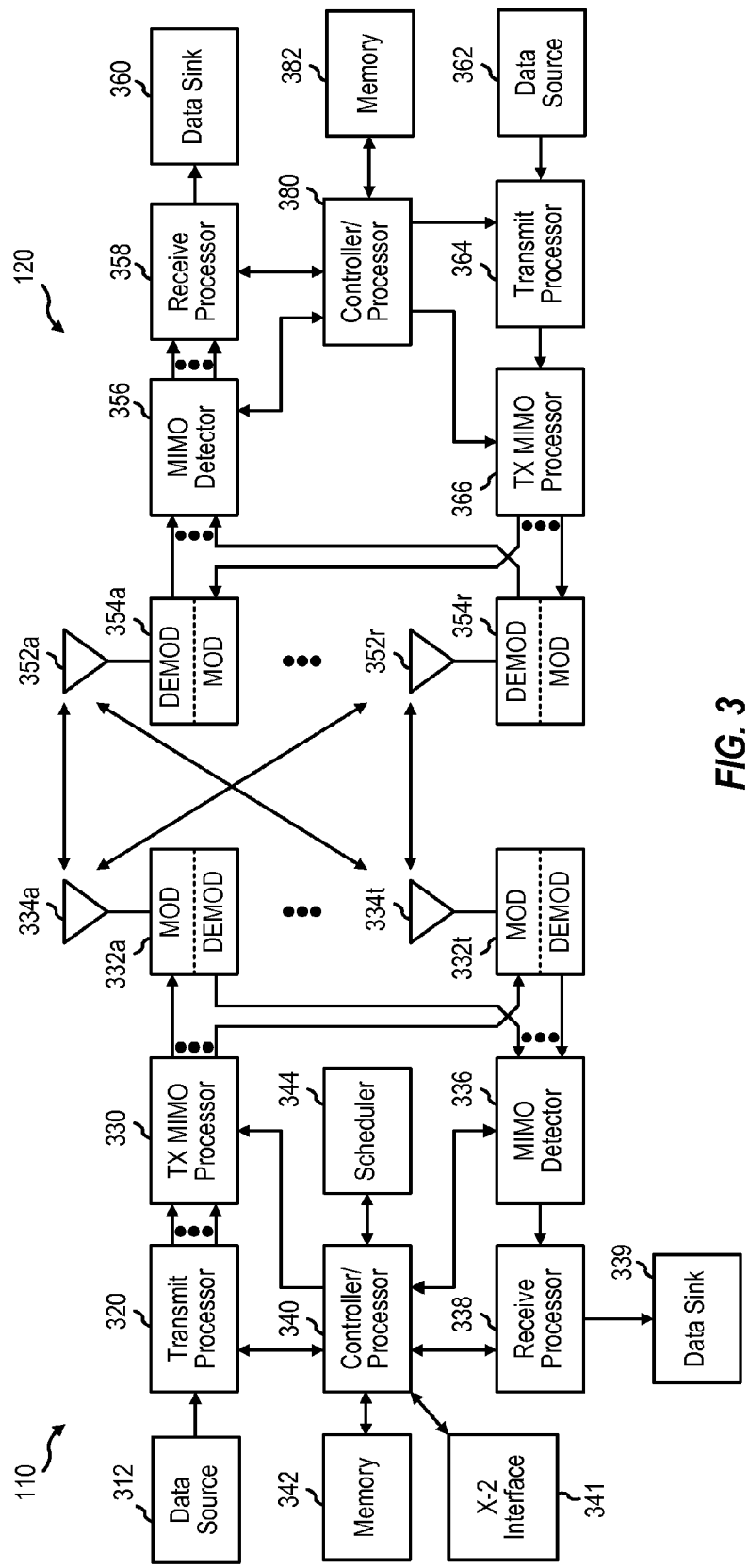
FIG. 3 is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340. The base station 110 can send messages to other base stations, for example, over an X2 interface 341.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in use method flow chart FIG. 6, and/or other processes for the techniques described herein. The memories 342 and 382 may store data and program codes for the base station 110 and the UE 120, respectively. A scheduler 344 may schedule UEs for data transmission on the downlink and/or uplink.

A UE may be within the coverage of multiple eNodeBs. One of these eNodeBs may be selected to serve the UE. The serving eNodeB may be selected based on various criteria such as received power, path loss, signal-to-noise ratio (SNR), etc.

A UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c with lower received power (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink.

When operating in the connected mode, the UE 120y may experience so much interference in this dominant interference scenario that it may no longer be able to maintain a acceptable connection with the eNodeB 110c, for example. The analysis of interference by the UE 120y includes obtaining the signal quality, such as by calculating the error rate of the PDCCH received on the downlink from the eNodeB 110c. Alternatively, the error rate of the PDCCH may be predicted based on the signal-to-noise ratio (SNR) of the PDCCH. If the error rate of the PDCCH, as calculated by the UE 120y, reaches a predefined level, the UE 120y will declare a radio link failure (RLF) to the eNodeB 110c and end the connection. At this point, the UE 120y may attempt to reconnect to the eNodeB 110c or possibly attempt to connect to another eNodeB with a stronger signal.

A dominant interference scenario may also occur due to range extension, which is a scenario in which a UE connects to an eNodeB with lower path loss and lower SNR among all eNodeBs detected by the UE. For example, in FIG. 1, the UE 120x may detect the macro eNodeB 110b and the pico eNodeB 110x and may have lower received power for the eNodeB 110x than the eNodeB 110b. Nevertheless, it may be desirable for the UE 120x to connect to the pico eNodeB 110x if the path loss for the eNodeB 110x is lower than the path loss for the macro eNodeB 110*b*. This may result in less interference to the wireless network for a given data rate for the UE 120*x*.

In addition to the discrepancies in signal power observed at the UEs in such a dominant interference scenario, timing delays of downlink signals may also be observed by the UEs, even in synchronous system, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could be reduced the level of a timing tracking loop (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 4A:
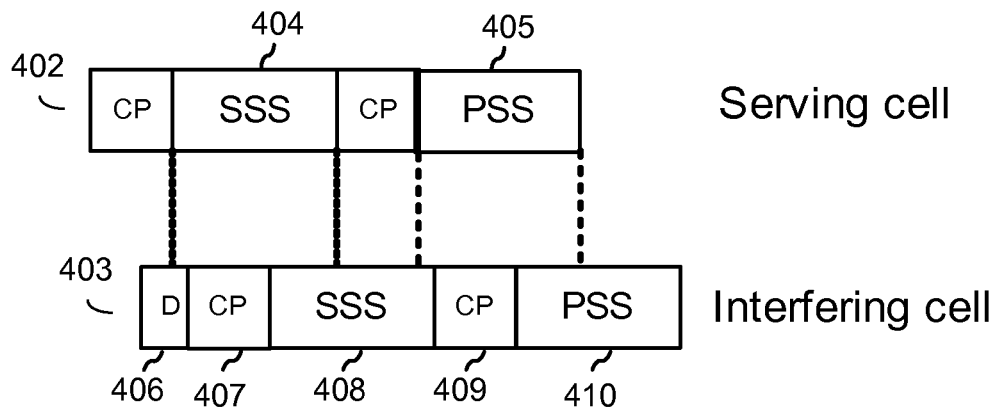
FIGS. 4A-4B are block diagrams illustrating signal cross correlation between downlink signals received from a serving cell and an interfering cell.

FIG. 4A is a block diagram conceptually illustrating a first signal cross correlation between downlink signals received from a serving cell and an interfering cell. A UE (not shown) receives the downlink signal 402 from the serving cell and also receives the downlink signal 403 from the interfering cell. The downlink signal 403 from the interfering cell has a timing delay compared with the downlink signal 402 from the serving cell. Ideally, when performing interference cancellation through cross correlation, each of the symbol periods of the signals being combined will match up, such that the same symbol period will be combined with its associated symbol period in the other signals. Slight mismatches will generally produce negligible impact on interference cancellation. However, where the mismatch is severe, serious performance degradation may occur.

As illustrated in FIG. 4A, the SSS symbol 404 not only collides with the cyclic prefix (CP) 407 but also collides with the data portion, D 406. Collision into the CP 407 may provide less of an impact on the interference cancellation because the CP 407 is predictable. However, collision into the data portion D 406 will cause serious performance degradation because the information in the data portion D 406 is unpredictable, as D may be any type of transmittable data. The PSS symbol 405 also not only collides with the CP 409, but also the SSS symbol 408. Based on the timing delay of the downlink signal 403 as compared against the downlink signal 402, the UE receiving these signals will likely experience serious performance degradation.

Figure 4B:
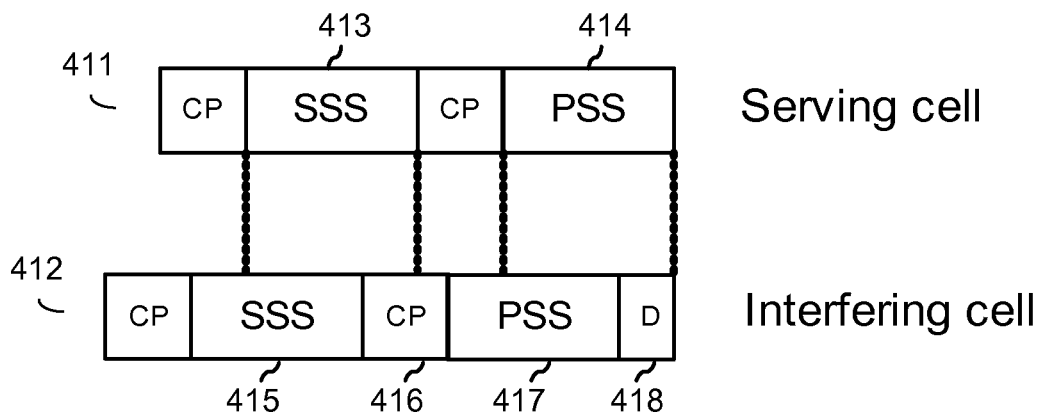

FIG. 4B is a block diagram conceptually illustrating a second signal cross correlation between downlink signals received from a serving cell and an interfering cell. The UE (not shown) receiving the downlink signals 411 and 412 from the serving cell and interfering cell, respectively, observes a time delay from the downlink signal 411. In this cross correlation example, the SSS symbol 413 matches up with part of the SSS symbol 415, but also collides into the CP 416. While this type of collision is not desirable, the interference cancellation process may still be successful. However, the PSS symbol 414 collides with the data portion D 418 of the downlink signal 412. Therefore, even though the PSS symbol 414 matches up with part of the PSS symbol 417, because the information within the data portion D 418 is unpredictable, the UE will also experience serious performance degradation.

Figure 5A:
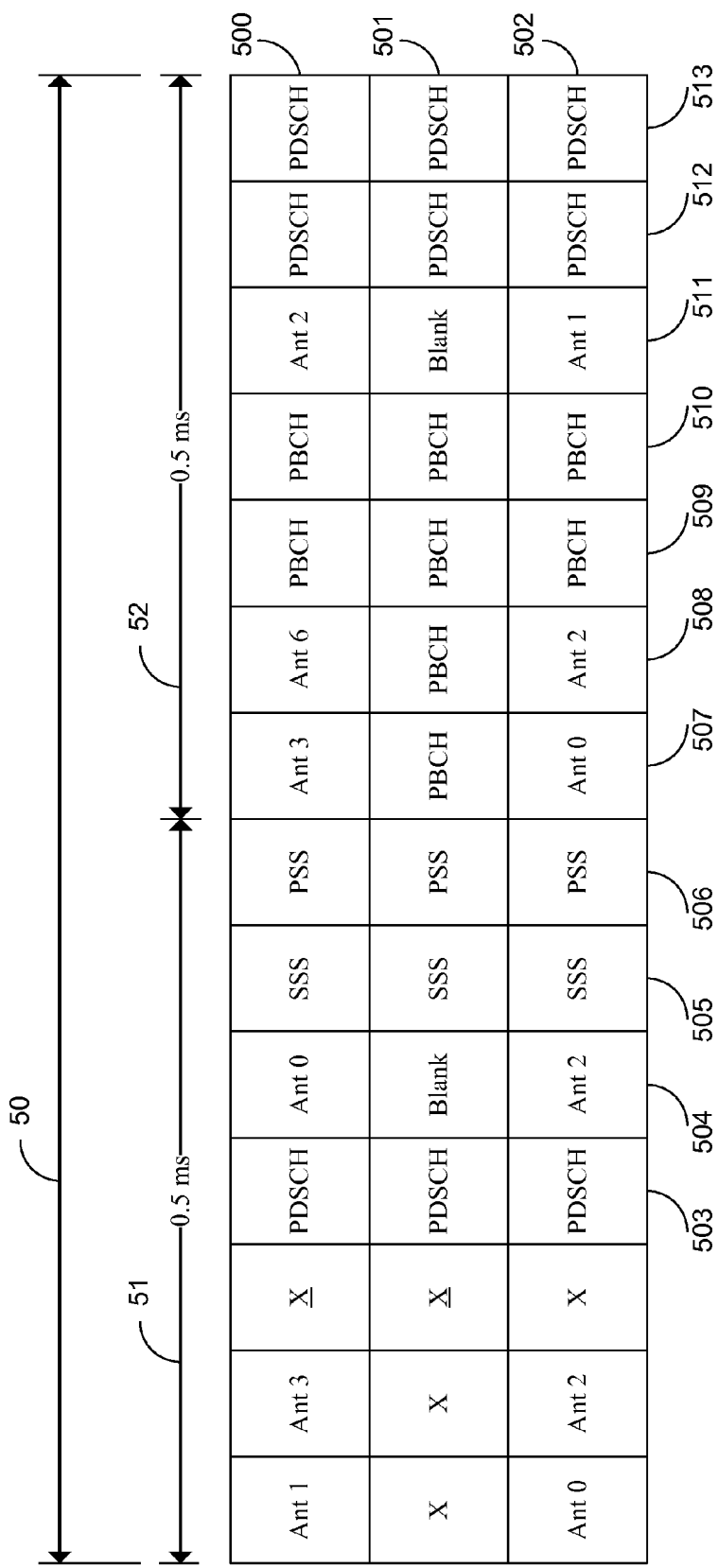
FIGS. 5A-5B are channel diagrams illustrating a frequency division duplex (FDD) subchannel configured according to one aspect of the present disclosure.

FIG. 5A is a channel diagram conceptually illustrating a central portion (e.g., 6 RB) of FDD subchannels 50 configured according to one aspect of the present disclosure. The FDD subchannels 50 are transmitted from a compatible eNodeB (not shown) to a UE (not shown) coupled to a wireless network. The subchannels 50 are each divided into two slots, slots 51 and 52. Each slot includes seven (7) symbol periods. FIG. 5A illustrates three rows of subchannels 50, rows 500-502. According to one aspect of the present disclosure, column 505 may include the secondary synchronization channel (SSC) (also referred to as secondary synchronization signal (SSS) symbols. Therefore, when generating the FDD subchannels 50, the eNodeB inspects the PDSCH symbols prior to the SSS symbols 505. If the eNodeB discovers that the PDSCH symbols in columns 504 and rows 500 and 502 each contain a reference signal, (i.e., Antenna 0 and Antenna 2), the reference signals are left alone. The PDSCH symbol at column 504 and row 501, however, does not include a reference signal. Accordingly, the eNodeB blanks the resource element at column 504 and row 501. The additional PDSCH symbols at column 503 remain intact in this example. The primary synchronization channel (PSC) (also referred to as primary synchronization signal (PSS) is located at column 506, and the PBCH symbols begin at column 507. Thus, the SSS is protected both before and after. Blanking occurs on the prior symbols, whereas the PSS PBCh provide the subsequent protection.

PBCH signals can also be protected in a similar manner. According to one aspect of the present disclosure, the eNodeB inspects the next PDSCH symbols after the PBCH region at columns 507-510. Again, the PDSCH symbols at column 511 and rows 500 and 502 each contain reference signals (i.e., Antenna 2 and Antenna 1), and the eNodeB leaves these symbols alone. Instead, the eNodeB blanks the resource element at column 511 and row 501. The remaining symbols in columns 512 and 513 remain untouched. The symbols preceding the PBCH region are PSS symbols and are thus not blanked.

In operation, as a UE receives the downlink subchannels 50 and combines with other copies of the downlink subchannels from other eNodeBs, the blanked symbol periods provide more room for the other combined or cross correlated symbol periods to safely collide. Because the blanked symbol periods are cleared, the information within those periods is very predictable, which will improve the interference cancelling when significant timing delays are experienced with the downlink subchannels 50.

Figure 5B:
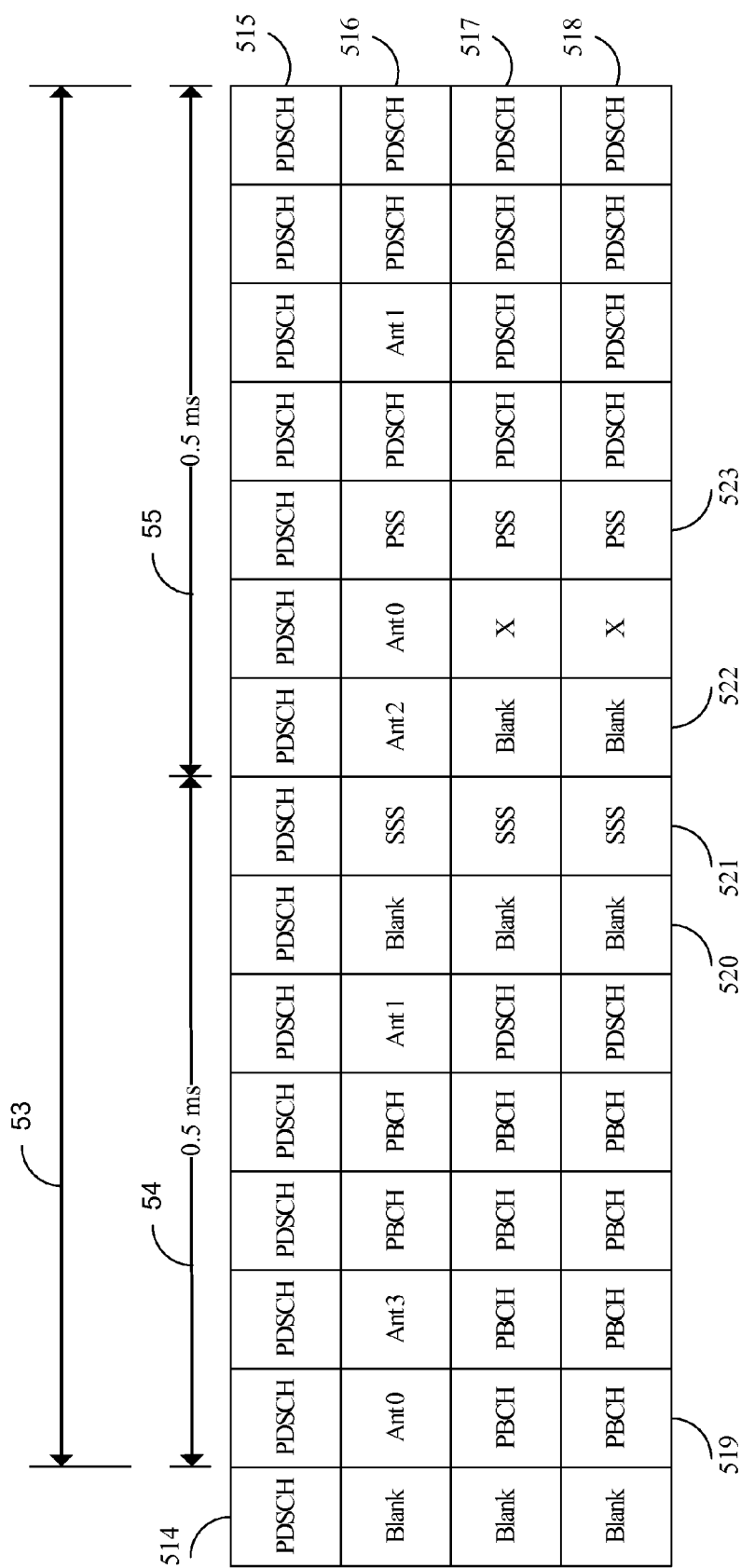

FIG. 5B is a channel diagram conceptually illustrating TDD subchannels 53 configured according to one aspect of the present disclosure. There are four central (e.g., including center 6 RBs) rows of the TDD subchannels 53 illustrated in FIG. 5B, rows 515-518. The TDD subchannels 53 are divided into two slots, slots 54 and 55 (e.g., slot 1 and slot 2), which define seven symbol periods in each slot. Also shown is the last symbol period 514 from a previous slot, e.g., slot 0. According to one aspect of the present disclosure, the eNodeB transmitting the TDD subchannels 53 will blank each of the extra symbols of the column 514. to protect the subsequent PBCH region starting in column 519. Although not shown, resource elements in the symbol period immediately following the PBCH region could also be blanked.

The SSS symbols of the TDD subchannels 53 are located at column 521. According to one aspect of the present disclosure, the eNodeB inspects the PDSCH symbols prior to the SSS symbols to determine if any reference signals are present. The eNodeB finds no reference signals at column 520 and, therefore, blanks each of the symbols in column 520. The eNodeB also inspects the PDSCH symbols after the SSS symbols for reference signals. The eNodeB finds a reference signal (i.e., Antenna 2), at column 522 and row 516 of the TDD subchannels 53 and leaves this reference signal alone. The eNodeB then blanks the other resource elements in column 522, thus protecting the SSS. (In this example, the resource elements designated by 'x' immediately preceding the PSS symbols include channels such as PCFICH, PHICH, PDCCH, etc.) In this example, the PSS is not protected by blanking preceding/following resource elements, but could be protected if desired.

Again, in operation, as a UE receives the TDD subchannels 53, the added blanked symbol periods allows for the interference cancelling to handle more significant time delays of the TDD subchannel 53 and still cancel the interference effectively.

Although FIGS. 5A-B are discussed with respect to a normal cyclic prefix, the present disclosure also contemplates an extended cyclic prefix configuration. Moreover, other signals, such as a reference signal, can be protected in addition to or instead of the SSS, PSS, and PBCH. Although PDSCH symbols are described as being punctured, other resource elements, such as PDCCH resource elements could also be punctured. However, in one aspect, the PBCH, PSS, SSS and reference signals, will not be punctured.

In another aspect, a timing offset between the serving cell and the interfering cell is calculated. Based on the calculation, a number of symbol periods to analyze for blanking can be determined. For example, if the timing offset is large, two symbol periods before and after a signal to be protected may be blanked, rather than one, as described above. The offset may also be considered to determine whether to puncturing before or after the resource element to be protected.

Figure 6:
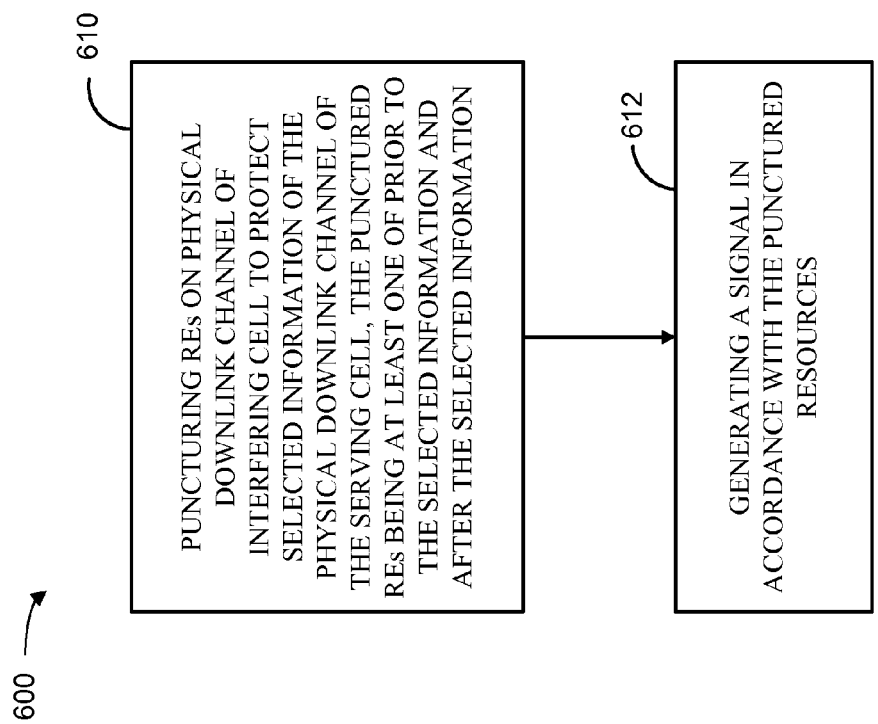
FIG. 6 is a block diagram illustrating methods for diminishing timing offset in downlink signals in wireless network.

FIG. 6 illustrates a method 600 for diminishing the impact of a timing offset in downlink signals in a wireless network having a serving cell and an interfering cell. In block 610, resource elements (REs) on the physical downlink channel of an interfering cell are punctured to protect the selected information of the physical downlink channel in a serving cell. The resource elements on the on the physical downlink channel of the interfering cell are punctured prior to the selected information and/or after the selected information. In block 612, a signal is generated in accordance with the punctured resources.

In one configuration, the eNodeB 110 is configured for wireless communication including means for puncturing. In one aspect, the puncturing means may be the controller/processor 340, memory 342, and scheduler 344, configured to perform the functions recited by the puncturing means. The eNodeB 110 is also configured to include a means for generating. In one aspect, the generating means may be the controller/processor 340, memory 342, and scheduler 344, transmit processor 320, modulator 332, and antenna 334 configured to perform the functions recited by the generating means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical

What is claimed is:

1. A method for diminishing an impact of timing offset in downlink signals in a wireless network having a serving cell and an interfering cell, the method comprising:
   determining resource elements in one or more first symbol periods, the one or more first symbol periods being located in a physical downlink channel of the interfering cell and including:
      at least one of a primary synchronization signal (FSS), secondary synchronization signal (SSS), first physical broadcast channel PBCH signal, or reference signal, and
      one or more symbols located at least one of before or after the at least one FSS, SSS, first FBCH signal, or reference signal;
   puncturing the resource elements in the first symbol periods in the physical downlink channel of the interfering cell to protect a synchronization channel or a second PBCH in a physical downlink channel of the serving cell,
   the puncturing excludes the resource elements determined to be the at least one of PSS, SSS, first PBCH signal, or reference signal and
   the puncturing includes removing at least one symbol from the one or more first symbol periods in the physical downlink channel of the interfering cell located:
      before a second symbol period containing the synchronization channel or the second PBCH,
      after the second symbol period containing the synchronization channel or the second FBCH, or
      both before and after the second symbol period containing the synchronization channel or the second FBCH; and
   generating a signal in accordance with the punctured resource elements.

2. The method of claim 1, wherein the puncturing comprises puncturing resource elements at least one of before and after the synchronization channel or the second PBCH in a time domain.

3. The method of claim 1, wherein the puncturing further comprises puncturing resource elements at least one of above and below the synchronization channel or the second PBCH in a frequency domain.

4. The method of claim 1, wherein the synchronization channel includes at least one of a primary synchronization channel (PSC) or a secondary synchronization channel (SSC).

5. The method of claim 1, further comprising determining a timing offset between a serving cell transmission and an interfering cell transmission received at a UE; and
   selecting a number of resource elements to puncture based on the timing offset.

6. The method of claim 1, wherein one or more symbols during the synchronization channel or the second PBCH are not removed from the physical downlink channel of the interfering cell.

7. An apparatus for wireless communication, comprising:
   means for determining resource elements in one or more first symbol periods, the one or more first symbol periods being located in a physical downlink channel of an interfering cell and including:
      at least one of a primary synchronization signal (PSS), secondary synchronization signal (SSS), first physical broadcast channel PBCH signal, or reference signal, and
      one or more symbols located at least one of before or after the at least one PSS, SSS, first PBCH signal, or reference signal;
   means for puncturing the resource elements in the first symbol periods in the physical downlink channel of the interfering cell to protect a synchronization channel or a second PBCH in a physical downlink channel of a serving cell,
   the puncturing excludes the resource elements determined to be the at least one of PSS, SSS, first PBCH signal, or reference signal and
   the puncturing includes removing at least one symbol from the one or more first symbol periods in the physical downlink channel of the interfering cell located:
      before a second symbol period containing the synchronization channel or the second PBCH,
      after the second symbol period containing the synchronization channel or the second PBCH, or
      both before and after the second symbol period containing the synchronization channel or the second PBCH; and
   means for generating a signal in accordance with the punctured resource elements.

8. The apparatus of claim 7, wherein the puncturing means punctures resource elements at least one of before and after the synchronization channel or the second PBCH in a time domain.

9. The apparatus of claim 7, wherein the puncturing means further punctures resource elements at least one of above and below the synchronization channel or the second PBCH in a frequency domain.

10. The apparatus of claim 7, wherein the synchronization channel includes at least one of a primary synchronization channel (PSC) or a secondary synchronization channel (SSC).

11. The apparatus of claim 7, further comprising means for determining a timing offset between a serving cell transmission and an interfering cell transmission received at a UE; and
    means for selecting a number of resource elements to puncture based on the timing offset.

12. A non-transitory computer-readable medium storing computer executable code for wireless communication, comprising code for:
    determining resource elements in one or more first symbol periods, the one or more first symbol periods being located in a physical downlink channel of an interfering cell and including:
       at least one of a primary synchronization signal (FSS), secondary synchronization signal (SSS), first physical broadcast channel PBCH signal, or reference signal, and
       one or more symbols located at least one of before or after the at least one FSS, SSS, first PBCH signal, or reference signal;

puncturing the resource elements in the first symbol periods in the physical downlink channel of the interfering cell to protect a synchronization channel or a second PBCH in a physical downlink channel of a serving cell, the puncturing excludes the resource elements determined to be the at least one of PSS, SSS, first PBCH signal, or reference signal and the puncturing includes removing at least one symbol from the one or more first symbol periods in the physical downlink channel of the interfering cell located:

before a second symbol period containing the synchronization channel or the second PBCH, after the second symbol period containing the synchronization channel or the second PBCH, or both before and after the second symbol period containing the synchronization channel or the second PBCH; and generating a signal in accordance with the punctured resource elements.

13. The non-transitory computer-readable medium of claim 12, wherein the code is configured for puncturing the resource elements by puncturing the resource elements at least one of before and after the synchronization channel or the second PBCH in a time domain.

14. The non-transitory computer-readable medium of claim 12, wherein the code is further configured for puncturing the resource elements at least one of above and below the synchronization channel or the second PBCH in a frequency domain.

15. The non-transitory computer-readable medium of claim 12, wherein the synchronization channel includes at least one of a primary synchronization channel (PSC) or a secondary synchronization channel (SSC).

16. The non-transitory computer-readable medium of claim 12, further comprising code for:

determining a timing offset between a serving cell transmission and an interfering cell transmission received at a UE; and selecting a number of resource elements to puncture based on the timing offset.

17. An apparatus for wireless communication, comprising:
a memory; and
at least one processor coupled to the memory and configured to:
determine resource elements in one or more first symbol periods, the one or more first symbol periods being located in a physical downlink channel of an interfering cell and including:

at least one of a primary synchronization signal (PSS), secondary synchronization signal (SSS), first physical broadcast channel PBCH signal, or reference signal, and one or more symbols located at least one of before or after the at least one PSS, SSS, first PBCH signal, or reference signal;

puncture the resource elements in the first symbol periods in the physical downlink channel of the interfering cell to protect a synchronization channel or a second PBCH in a physical downlink channel of a serving cell, the puncturing excludes the resource elements determined to be the at least one of PSS, SSS, first PBCH signal, or reference signal and the puncturing includes removing at least one symbol from the one or more first symbol periods in the physical downlink channel of the interfering cell located:

before a second symbol period containing the synchronization channel or the second PBCH, after the second symbol period containing the synchronization channel or the second PBCH, or both before and after the second symbol period containing the synchronization channel or the second PBCH; and generate a signal in accordance with the punctured resource elements.

18. The apparatus of claim 17, wherein the at least one processor is further configured to puncture resource elements at least one of before and after the synchronization channel or the second PBCH in a time domain.

19. The apparatus of claim 17, the at least one processor is further configured to puncture resource elements at least one of above and below the the synchronization channel or the second PBCH in a frequency domain.

20. The apparatus of claim 17, wherein the synchronization channel includes at least one of a primary synchronization channel (PSC) or a secondary synchronization channel (SSC).

21. The apparatus of claim 17, wherein the processor is further configured to determine a timing offset between a serving cell transmission and an interfering cell transmission received at a UE, and to select a number of resource elements to puncture based on the timing offset.

* * * * *